United States Patent [19]

Anthony

[11] 4,129,884

[45] Dec. 12, 1978

[54] SYSTEMS FOR SUPPLYING UNMODULATED BASEBAND SIGNALS TO TELEVISION RECEIVERS

[75] Inventor: Patrick R. Anthony, Kitchener, Canada

[73] Assignee: Electrohome Limited, Kitchener, Canada

[21] Appl. No.: 855,381

[22] Filed: Nov. 28, 1977

[51] Int. Cl.² .............................................. H04N 5/44
[52] U.S. Cl. .................................................. 358/188
[58] Field of Search .......................... 358/81, 82, 188

[56] References Cited

U.S. PATENT DOCUMENTS 3,728,480  4/1973  Baer ................................... 358/82 X Primary Examiner—Robert L. Richardson
Attorney, Agent, or Firm—Sim & McBurney

[57] ABSTRACT

Unmodulated baseband video signals such as those of a TV game are supplied to a television receiver through a system which provides high isolation between the signal source and the internal circuits of the receiver when disabled. When this system is enabled, the internal video detector of the receiver is disabled by being clamped off and the unmodulated video signals are injected into the receiver video circuitry beyond the detector.

6 Claims, 1 Drawing Figure

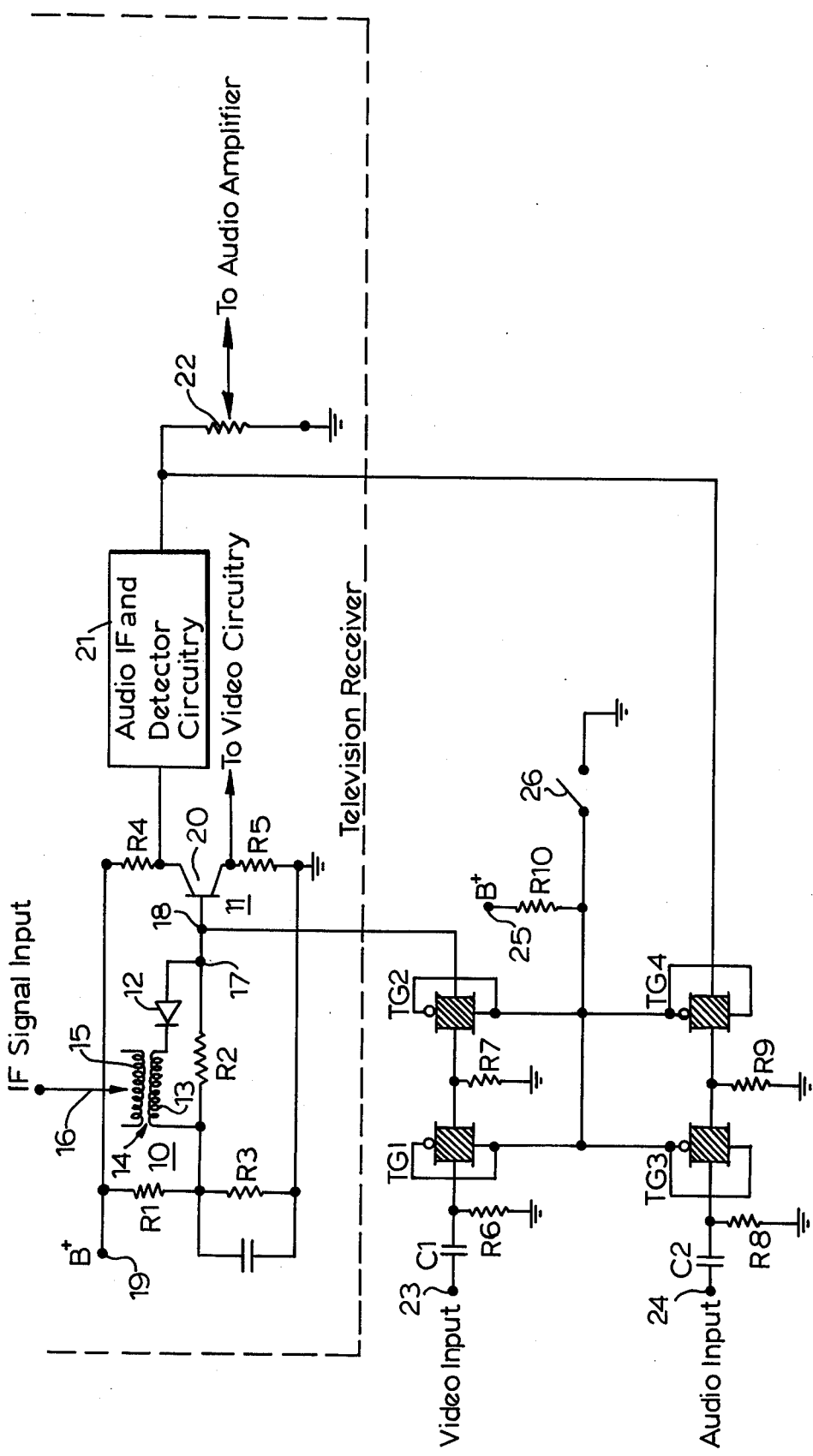

SYSTEMS FOR SUPPLYING UNMODULATED BASEBAND SIGNALS TO TELEVISION RECEIVERS

BACKGROUND OF THE INVENTION

This invention relates to systems for supplying unmodulated video signals to television receivers. This invention also relates to systems for supplying unmodulated video and audio signals to television receivers.

There are a number of circumstances in which it may be desired to supply what could be referred to as "locally generated" video signals to a television receiver, "locally generated" signals being signals other than cable or "on-air" signals. For example, so-called TV games have become popular. The game is a locally generated video (and, often audio) signal that is supplied to a television receiver. The "locally generated" video signal also may be a serial data output signal of a computer, this being supplied to a monitor that becomes a data display unit for the computer.

In the past "locally generated" signals have been modulated and fed to the cable or antenna input of the receiver or monitor. This has disadvantages compared with a system using unmodulated signals. Firstly, resolution is poorer because limitations are imposed by the R.F. and I.F. bandwidth that is available. Secondly, the former system is more expensive than the latter because of the requirement for a modulator. Thirdly, the modulator must be designed to meet D.O.T. or F.C.C. radiation standards so that the local generator will not radiate signals that will cause interference with other equipment. Fourthly, a relatively expensive switching arrangement capable of providing about 60 db attenuation must be employed in order to prevent (a) radiation of the "locally generated" signal via the receiver antenna system and (b) interference by the "locally generated" signal with broadcast reception when the receiver mode is selected.

In accordance with this invention there is provided a system for supplying unmodulated video signals to television receivers which overcomes a number of the disadvantages of the systems referred to in the preceding paragraph.

SUMMARY OF THE INVENTION

In accordance with one aspect of this invention there is provided in combination with a television receiver having a video detector for processing video IF signals, said detector including a detector diode and an output terminal at which a detected video signal is derived, an amplifier having an input terminal, means connecting said input and output terminals, whereby said amplifier amplifies signals detected by said diode, apparatus for selectively supplying unmodulated video signals to said receiver from an external source, said apparatus including a signal input terminal adapted to receive said unmodulated video signals, a variable impedance device having a relatively high impedance in a first state thereof and a relatively low impedance in a second state thereof, means connecting said variable impedance device in circuit between said signal input terminal and said output terminal of said video detector, means for selectively varying the impedance of said variable impedance device between said first and second states thereof and means responsive to said variable impedance device being in said second state thereof for developing and applying to said detector diode a bias signal that biases said detector diode off, whereby when said variable impedance device is in said second state thereof said detector is clamped off and thus is unable to process said video IF signals while said unmodulated video signals are applied to said input terminal of said amplifier, in said first state of said variable impedance device said detector diode being biased for processing said video IF signals and said unmodulated video signals being isolated from said amplifier by the high impedance of said variable impedance device.

BRIEF DESCRIPTION OF THE DRAWING

The drawing illustrates a circuit embodying this invention.

DETAILED DESCRIPTION OF THE INVENTION INCLUDING THE PREFERRED EMBODIMENT

Referring to the drawing, a conventional television receiver, only a part of which is shown, includes a video detector 10 and a buffer amplifier 11.

Video detector 10 includes a detector diode 12 connected in circuit with the secondary 13 of a transformer 14, the final tuned video IF transformer, before video detection, of the television receiver. The output terminal 17 of detector 10 is connected to the input terminal 18 of buffer 11.

Bias for diode 12 is provided via a voltage divider consisting of resistor R1 and R3 connected between a terminal 19 at a positive D.C. potential, B, and ground.

Buffer 11 is in the form of a transistor 20 whose collector is connected via a resistor R4 to terminal 19. A resistor R5 is connected between the emitter of transistor 20 and ground.

As is well known, in normal operation detector 10 detects the video components of the I.F. signal. The audio and video components are separated by buffer 11, the audio signal being derived at the collector of transistor 20 and the video signal being derived at the emitter of transistor 20. The audio signal (intercarrier sound signal) is supplied to conventional audio I.F. and detector circuitry 21, while the video signal is aupplied to conventional video circuitry. As shown, the audio output of network 21 is applied across a volume control potentiometer 22, the slider of which may be connected to an audio amplifier which, in turn, is connected to a loudspeaker.

Further description of the part of the television receiver shown and its mode of operation is not believed necessary because the part of the receiver shown and its mode of operation are well known to those skilled in the art.

Terminals 23 and 24 to which unmodulated video and audio signals respectively, e.g., from a TV game, can be supplied are provided. Terminal 23 is connected via a capacitor C1 and transmission gates TG1 and TG2 to input terminal 18. Resistors R6 and R7 are connected as shown in the FIGURE.

Likewise terminal 24 is connected via a capacitor C2 and transmission gates TG3 and TG4 to the upper terminal of volume control potentiometer 22. Resistors R8 and R9 are connected as shown in the FIGURE.

Bias for the transmission gates is provided via a resistor R10 from a terminal 25 at B potential. The opposite terminal of resistor R10 from that connected to terminal 25 can be connected to ground via a switch 26 when switch 26 is closed.

When it is desired to supply a video signal to the television receiver from terminal 23, switch 26 is opened. Transmission gates TG1 and TG2 thus are turned on and their impedance drops to a few hundred ohms. The transmission gates and resistors R6 and R7 are selected so that under these conditions the resistance of transmission gate TG1 is much less than the single equivalent resistance of resistors R6 and R7, and the resistance of transmission gate TG2 is much less than the input impedance seen by transmission gate TG2 looking into terminal 18. Resistor R1, and resistor R2 connected as shown in the FIGURE and the single equivalent resistance of resistors R6 and R7 constitute a voltage divider connected between terminal 19 and ground. These resistors are so selected that detector diode 12 is reverse biased when transmission gates TG1 and TG2 are turned on, thus clamping video detector 10 off while not moving the quiescent point of buffer 11 so far as to cause distortion of the video signal supplied from terminal 23 via transmission gates TG1 and TG2 to input terminal 18. Under these circumstances the I.F. signal cannot be detected, and the unmodulated video signal at terminal 23 is supplied to buffer 11 and thence to conventional video amplifier circuitry.

In the case where a TV game is involved, opening of switch 26 to turn on the transmission gates and supply the unmodulated video game signal to the receiver may be achieved by plugging one of the "paddles" of the game into an appropriate socket (not shown) with which switch 26 is mechanically associated.

In order to return to the mode of operation of the receiver where the I.F. signal is processed, switch 26 is closed removing the bias from transmission gates TG1 and TG2. Under these circumstances the impedance of each transmission gate becomes very high. The impedance of transmission gate TG1 is very high relative to that of the single equivalent resistance of resistors R6 and R7. The impedance to transmission gate TG2 is very high relative to the input impedance seen by the latter looking into terminal 18. As a consequence there is excellent isolation between terminal 23 and terminal 18, and detector diode 12 ceases to be reverse biased, so detector 10 no longer is clamped off.

If desired the same technique as disclosed above may be used for supplying unmodulated audio signals to the receiver from terminal 24. It should be noted in this connection that when unmodulated video signals from terminal 23 are being processed by the receiver, there is no audio signal at the collector of transistor 20. Since the audio signal at terminal 24 to be processed is unmodulated, it can be supplied directly to volume control potentiometer 22. As soon as switch 26 is closed, any audio signal at terminal 24 will be effectively isolated from the receiver.

While reference has been made herein to the use of transmission gates, each of which is constituted by an inverter and two FET's, one N type and one P type, as known to those skilled in the art, other variable impedance devices could be used in place of transmission gates. A single FET transmission gate also could be used but doesn't have as good a frequency response as the dual type.

Also while reference has been made herein to a television receiver, the instant invention is equally applicable to a monitor, and the term "television receiver" as used herein and in the claims is to be broadly construed to include monitors and other equivalent devices.

While a preferred embodiment of this invention has been described herein, those skilled in the art will appreciate that changes and modifications may be made without departing from the spirit and scope of this invention as defined in the appended claims.

What is claimed is:

1. In combination with a television receiver having a video detector for pocessing video I.F. signals, said detector including a detector diode and an output terminal at which a detected video signal is derived, an amplifier having an input terminal, means connecting said input and output terminals, whereby said amplifier amplifies signals detected by said diode, apparatus for selectively supplying unmodulated video signals to said receiver from an external source, said apparatus including a signal input terminal adapted to receive said unmodulated video signals, a variable impedance device having a relatively high impedance in a first state thereof and a relatively low impedance in a second state thereof, means connecting said variable impedance device in circuit between said signal input terminal and said output terminal of said video detector, means for selectively varying the impedance of said variable impedance device between said first and second states thereof and means responsive to said variable impedance device being in said second state thereof for developing and applying to said detector diode a bias signal that biases said detector diode off, whereby when said variable impedance device is in said second state thereof said detector is clamped off and thus is unable to process said video I.F. signals while said unmodulated video signals are applied to said input terminal of said amplifier, in said first state of said variable impedance device said detector diode being biased for processing said video I.F. signals and said unmodulated video signals being isolated from said amplifier by the high impedance of said variable impedance device.

2. The combination according to claim 1 wherein said variable impedance device comprises transmission gate means.

3. The combination according to claim 2 wherein said means for selectively varying comprises means for varying the conductance of said transmission gate means.

4. In combination with a television receiver having a video detector for processing video I.F. signals, said detector including a detector diode and an output terminal at which a detected video signal is derived, an amplifier having an input terminal, means connecting said input and ouput terminals, whereby said amplifier amplifies signals detected by said diode, and an audio signal processing channel including an audio detector and a loudspeaker, apparatus for selectively supplying unmodulated audio and video signals to said receiver from an external source, said apparatus including a first signal input terminal adapted to receive said unmodulated video signals, a second signal input terminal adapted to receive said unmodulated audio signals, first and second variable impedance devices each having a relatively high impedance in a first state thereof and a relatively low impedance in a second state thereof, means connecting said first variable impedance device in circuit between said first signal input terminal and said output terminal of said video detector, means connecting said second variable impedance device in circuit between said second signal input terminal and a part of said audio signal processing channel between said audio detector and said loudspeaker for supplying audio signals at said second terminal to said loudspeaker via said second variable impedance device when in said second state thereof, means for selectively varying the impedance of said variable impedance devices between said first and second states thereof and means responsive to said first variable impedance device being in said second state thereof for developing and applying to said detector diode a bias signal that biases said detector diode off, whereby when said first variable impedance device is in said second state thereof said detector is clamped off and thus is unable to process said video I.F. signal while said unmodulated video signals are applied to said input terminal of said amplifier, in said first state of said first variable impedance device said detector diode being biased for processing said video I.F. signals and said unmodulated video signals being isolated from said amplifier by the high impedance of said first variable impedance device, in said first state of said second variable impedance device said unmodulated audio signals being isolated from said loudspeaker by the high impedance of said second variable impedance device.

5. The combination according to claim 4 wherein said variable impedance devices are transmission gates.

6. The combination according to claim 5 wherein said means for selectively varying comprises means for varying the conductance of said transmission gates.